US010394515B2

(12) United States Patent
Park

(10) Patent No.: US 10,394,515 B2
(45) Date of Patent: Aug. 27, 2019

(54) DISPLAY DEVICE, ALWAYS-ON-DISPLAY CONTROL METHOD AND MOBILE TERMINAL USING THE SAME

(71) Applicant: LG Display Co., Ltd., Seoul (KR)

(72) Inventor: Youngju Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/687,735

(22) Filed: Aug. 28, 2017

(65) Prior Publication Data

US 2018/0088892 A1    Mar. 29, 2018

(30) Foreign Application Priority Data

Sep. 29, 2016    (KR) .................. 10-2016-0125533

(51) Int. Cl.
*G06F 3/048*   (2013.01)
*G06F 3/14*   (2006.01)
*G06F 3/0484*   (2013.01)
*G09G 3/3233*   (2016.01)

(52) U.S. Cl.
CPC ........ *G06F 3/1462* (2013.01); *G06F 3/04842* (2013.01); *G06F 3/1431* (2013.01); *G09G 3/3233* (2013.01); *G09G 2300/0852* (2013.01); *G09G 2300/0895* (2013.01); *G09G 2310/06* (2013.01); *G09G 2320/045* (2013.01); *G09G 2320/0613* (2013.01); *G09G 2330/022* (2013.01); *G09G 2330/12* (2013.01); *G09G 2340/0464* (2013.01)

(58) Field of Classification Search
CPC . G06F 3/048; G06F 3/14; G06F 3/147; G06F 3/033; H04M 1/02; G09G 5/08
See application file for complete search history.

(56) References Cited

U.S. PATENT DOCUMENTS

| 5,827,071 A * | 10/1998 | Sorensen ............... G09B 5/065 434/323 |
| 2008/0055336 A1* | 3/2008 | Matsushita .............. G09G 5/30 345/619 |
| 2010/0313172 A1* | 12/2010 | Hirahara ............... G06F 1/3218 715/867 |
| 2013/0339345 A1* | 12/2013 | Soto Matamala ...... H04W 4/21 707/722 |
| 2015/0138178 A1* | 5/2015 | Woo ..................... G09G 3/3233 345/212 |

* cited by examiner

*Primary Examiner* — Pegeman Karimi
(74) *Attorney, Agent, or Firm* — Morgan, Lewis & Bockius LLP

(57) ABSTRACT

A display device, an AOD control method for the same, and a mobile terminal using the same are provided. An event view is displayed on a display panel in a first screen mode, and preset information is displayed on the display panel in a second screen mode. A display position of the information in the second screen mode is changed when the second screen mode is resumed after the first screen mode is finished.

9 Claims, 6 Drawing Sheets

DISPLAY DEVICE, ALWAYS-ON-DISPLAY CONTROL METHOD AND MOBILE TERMINAL USING THE SAME

This application claims the priority benefit of Korean Patent Application No. 10-2016-0125533 filed on Sep. 29, 2016, the entire contents of which is incorporated herein by reference for all purposes as if fully set forth herein.

BACKGROUND

Technical Field

The present invention relates to a display device, and more particularly to a display device that displays information on a part of the screen and a mobile terminal using the same. Furthermore, the present invention relates to an always-on-display (AOD) control method for a display device.

Discussion of the Related Art

Various types of flat-panel displays are being developed, including liquid-crystal display devices (LCDs), organic light-emitting diode displays (OLED displays), etc. In an active matrix display device, each pixel has a thin-film transistor (hereinafter, "TFT").

Mobile terminals include portable phones, smartphones, tablet computers, laptop computers, wearable devices, etc. In a mobile terminal, the display stops working in standby mode to reduce power consumption.

The user has to switch on and off the display of the mobile terminal on and off repeatedly to restart the mobile terminal when they want to see simple information such as the clock. To save the user from this inconvenience, an AOD function is being added to mobile terminals, which always shows user-specified information such as the clock, calendar, etc. on the screen. When the AOD function is activated, the mobile terminal always displays simple AOD information such as a clock, messages, and images by running only a part of the screen rather than the entire screen. If AOD information is displayed always at the same position, the corresponding pixels will be severely degraded. In the case of an OLED display, if AOD information is displayed at a fixed position, the pixels at this position will burn in. Burn-in refers to a permanent afterimage caused by leaving a previous static pattern (text, image, etc.) on screen for too long, which occurs even when other images are displayed on the pixels that have displayed the static pattern, due to degradation of the OLEDs of the pixels. Thus, burn-in will leave afterimages even of normal images which are shown on the entire screen.

In view of this, a method to be taken into consideration is to count the display time of AOD information and shift the display position of AOD information at preset time intervals. However, this method lets the user see the AOD information shifting its display position, so the user is bound to see the screen too often.

SUMMARY

Accordingly, embodiments of the present disclosure are directed to a display device, always-on-display control method and mobile terminal using the same that substantially obviate one or more of the problems due to limitations and disadvantages of the related art.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings An aspect of the present disclosure is to provide a display device that can prevent an afterimage leftover from displaying AOD information and save the user from inconvenience caused by a shift in AOD display position, an AOD control method for the same, and a mobile terminal using the same.

To achieve these and other aspects of the inventive concepts, as embodied and broadly described, a display device comprises: a display panel comprising a pixel array of pixels arranged in a matrix by the intersections of data lines and gate lines; and a drive circuit that writes data to the pixels of the display panel, wherein the drive circuit displays an event view on the display panel in a first screen mode and displays preset information on the display panel in a second screen mode, and a display position of the information in the second screen mode is changed when the second screen mode is resumed after the first screen mode is finished.

In another aspect, an AOD control method for a display device comprises: displaying an event view on the display panel in a first screen mode; displaying preset information on the display panel in a second screen mode; and changing a display position of the information in the second screen mode when the second screen mode is resumed after the first screen mode is finished.

In another aspect, a mobile terminal comprises: a display panel comprising a pixel array of pixels arranged in a matrix by the intersections of data lines and gate lines; a drive circuit that writes data to the pixels of the display panel; and a controller that controls the first screen mode and the second screen mode, wherein the drive circuit displays an event view on the display panel in a first screen mode and displays preset information on the display panel in a second screen mode, and a display position of the information in the second screen mode is changed when the second screen mode is resumed after the first screen mode is finished.

The AOD information may be one or more of the following: a clock, text, image, and icon image associated with an application, and comprises always-on-display (AOD) information that is specified as selected by the user.

The controller may comprise an application processor (AP).

It is to be understood that both the foregoing general description and the following detailed description are exemplary and explanatory and are intended to provide further explanation of the inventive concepts as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
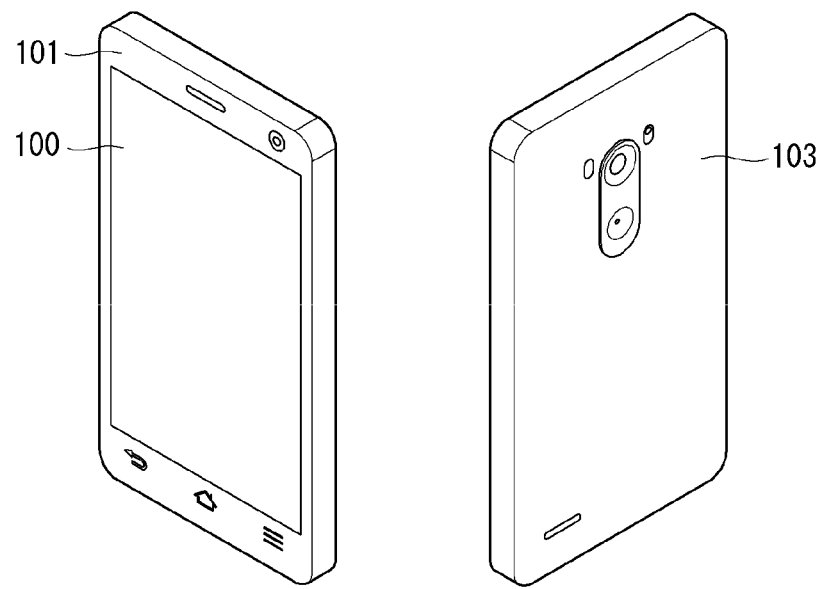
FIGS. 1 and 2 schematically show a mobile terminal according to an exemplary embodiment of the present invention.

Prior to describing example embodiments of the present invention, terms used in the embodiment will be defined as follows.

An event refers to every usage environment in which the entire screen of a display device is used without displaying AOD information. For example, an event is a usage environment other than those in which AOD information is displayed, such as when a call comes in or is received, a text or SMS message is sent or received, a broadcast signal or multimedia content is displayed on a display device, or the user artificially restarts the screen.

AOD information in the present invention may be displayed on a part of the screen in a usage environment, for example, standby mode, in which no event occurs. The AOD information may be information, such as a clock, text, image, or icon image associated with an application that can be specified as selected by the user.

In the present invention, the position of an AOD information display area is changed when the AOD information begins to reappear after an event is run, in order to prevent a permanent afterimage. Particularly, in the present invention, the position of the AOD display area is shifted when the AOD information display environment is resumed after at least one event is run, rather than shifting the AOD display area while the AOD information is being displayed. As a result, the display position of the AOD information is shifted while the user does not notice the AOD information shifting in the AOD information display environment. Therefore, the present invention can save the user from inconvenience caused by the shift of the AOD information and avoid an afterimage.

Another method to be taken into consideration is to count the display time of AOD information while the AOD information is being displayed and shift the AOD information to other positions when the count reaches a particular set period of time, e.g., 1 minute. In this method, however, the AOD information is displayed regardless of events, so the AOD information is shifted at specific time intervals, and the user will frequently notice the AOD information shifting. As the AOD information display area is shifted at specific time intervals while the AOD information is being displayed, the user is bound to notice the AOD information display area shifting, which the user may find inconvenient. As stated above, in the present invention, the display position of AOD information is changed after an event is run, rather than shifting the display position of the AOD information in the AOD information display environment. Thus, the AOD information display position is changed discontinuously between event runs, while the user does not notice the AOD information shifting in real time.

Advantages and features of the present disclosure and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Hereinafter, exemplary embodiments of the present invention will be described in detail with reference to the accompanying drawings. Throughout the specification, the same reference numerals indicate substantially the same components. In describing the present invention, when it is deemed that a detailed description of known functions or configurations may unnecessarily obscure the subject matter of the present invention, the detailed description will be omitted.

Figure 2:
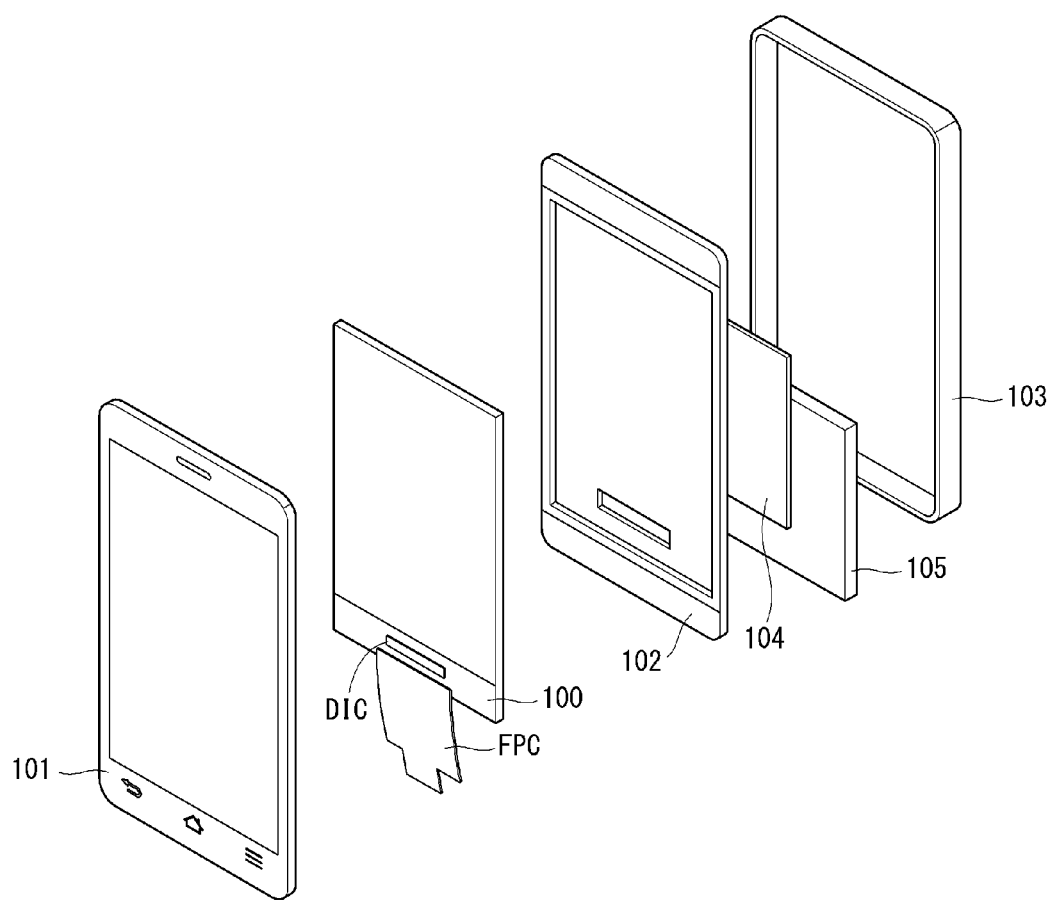

FIGS. 1 and 2 schematically show a mobile terminal according to an exemplary embodiment of the present invention. It should be noted that while FIGS. 1 and 2 illustrate a mobile terminal with a full touchscreen structure, the present invention is not limited thereto.

Referring to FIGS. 1 and 2, a mobile terminal according to the present invention comprises a display device, a front cover 101, a back cover 103, a midframe, a mainboard 104, a battery 105, etc. Here, the "cover" may be represented as a case or a housing.

A display device of the present invention may be implemented as a flat-panel display such as a liquid-crystal display, an organic light-emitting diode display (OLED display), etc. The display device comprises a display panel 100 for such a flat-panel display and a display panel drive circuit. On the display panel 100, touch sensors may be disposed on the entire screen. The display panel drive circuit comprises a drive IC DIC and a flexible circuit board that connects the drive IC DIC to the mainboard 104. The drive IC DIC writes image data input through the mainboard 104 to pixels on the display panel 100. The flexible circuit board may be a flexible printed circuit board (FPC).

The front cover 101 comprises tempered glass covering the display panel 100. The front cover 101 covers the front of the mobile terminal. The screen of the display panel 100 is exposed to the front of the mobile terminal. A rear camera and various types of sensors may be disposed on the back of the mobile terminal. The sensors are types of sensors that can be adapted to the mobile terminal, including, for example, a proximity sensor, a gyroscope sensor, a geomagnetic sensor, a motion sensor, an illumination sensor, an RGB sensor, a Hall sensor, a temperature/humidity sensor, a heartbeat sensor, a fingerprint sensor, etc.

The display device, midframe 102, mainboard 104, battery 105, etc. are disposed in the space between the front cover 101 and the back cover 103. The midframe 102 supports the display panel 100, and spatially separates the display panel 100 and the mainboard 104. The flexible circuit board FPC of the display device is connected to the mainboard 104. An A/V (audio/video) input, a user input region, a speaker, a microphone, etc. are installed on the front cover 101 and the back cover 103. The A/V input, user input region, speaker, and microphone are connected to the mainboard 104. The user input region may be configured with a touch keypad, a dome switch, a touch pad, a jog wheel, a jog switch, etc.

The mainboard 104 comprises a display device, a wireless communication module, a short-range communication module, a mobile communication module, a broadcast receiving module, an A/V input, a global positioning system (GPS) module, a power circuit, etc. The user input region, speaker, microphone, battery 105, etc. are connected to the mainboard 104. The power circuit supplies the voltage of the battery 105 to circuits on the mainboard 104 and a module power supply of the display panel drive circuit after eliminating noise. The mainboard 104 of the mobile device may comprise an application processor (AP). The AP sends and receives image data to and from the drive IC DIC of the display device via a mobile industry processor interface (MIPI).

The mainboard 104 may be a mainboard for a phone system, TV (television) system, set-top box, navigation system, DVD player, Bluray player, personal computer PC, home theater system, etc.

Figure 3:
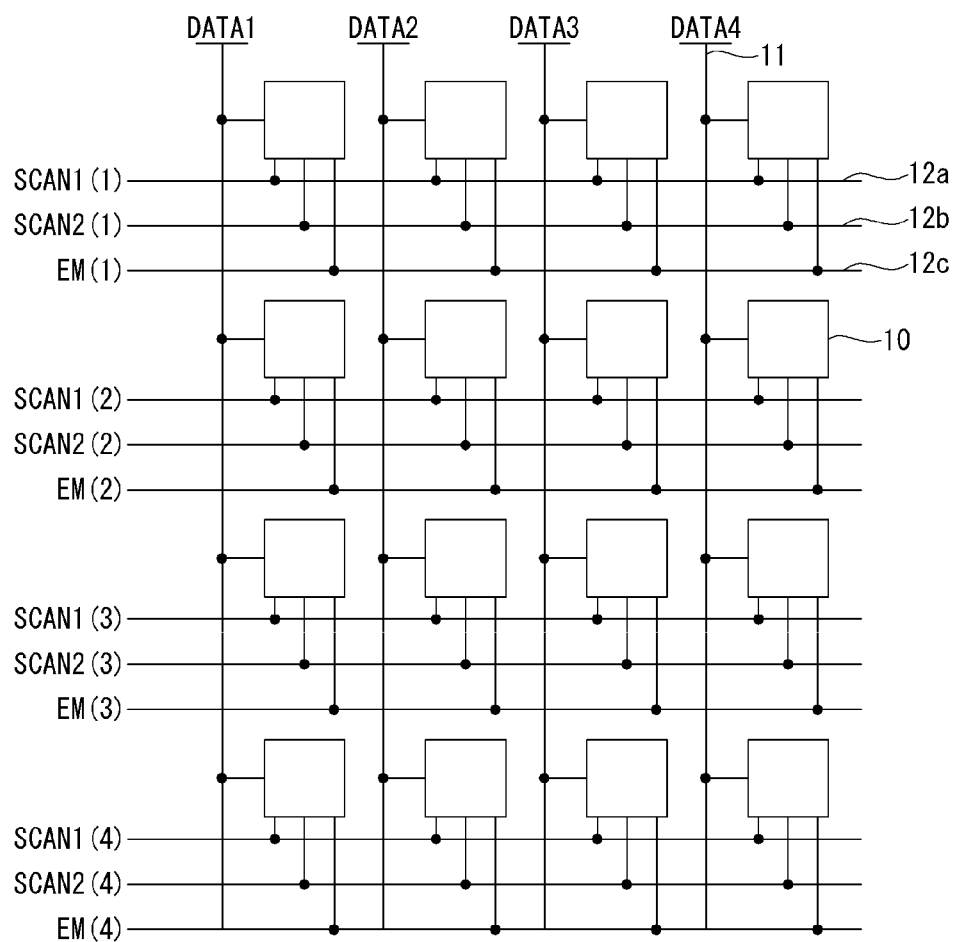
FIG. 3 is a view showing some pixels of an OLED display.
Figure 4:
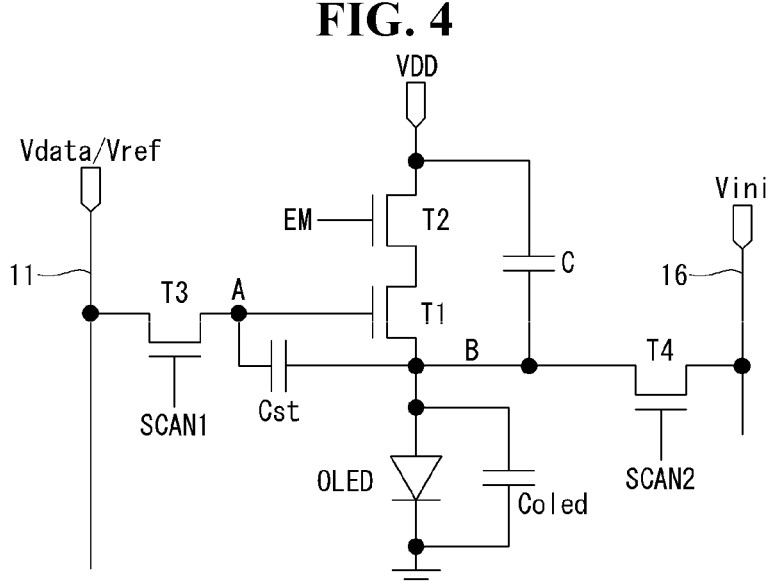
FIG. 4 is a circuit diagram showing an example of a pixel.
Figure 5:
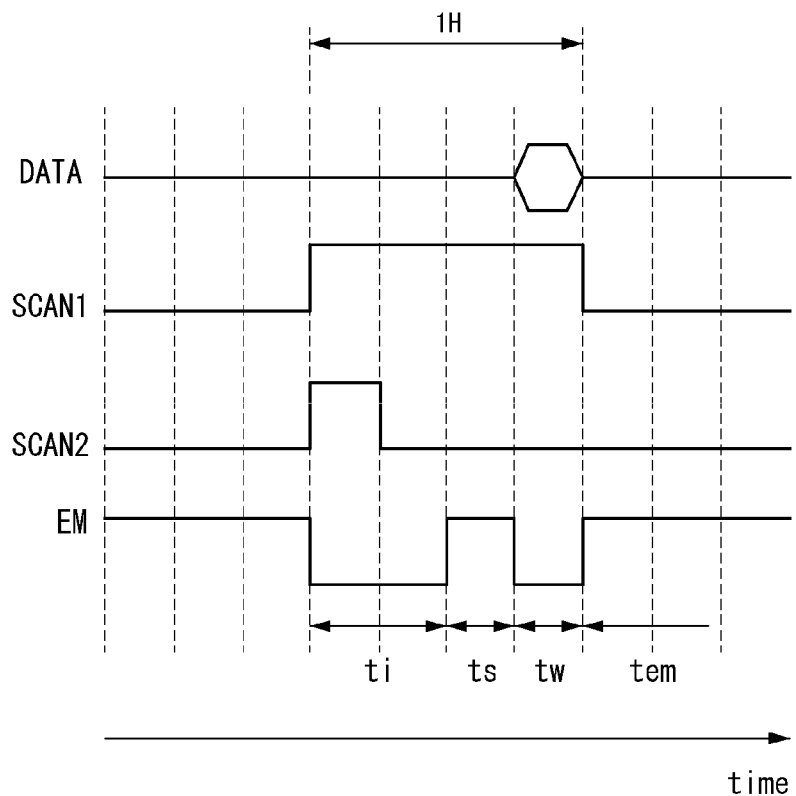
FIG. 5 is a waveform diagram showing signals that are input into the pixels of FIG. 4.

FIG. 3 is a view showing some pixels of an OLED display. FIG. 4 is a circuit diagram showing an example of a pixel. FIG. 5 is a waveform diagram showing signals that are input into the pixels of FIG. 4. It should be noted that a display device of the present invention is not limited to FIGS. 3 to 5.

Referring to FIGS. 3 to 5, the display panel 100 comprises a plurality of data lines 11, a gate lines 12a, 12b, and 12c intersecting the data lines 11, and a pixel array of pixels 10 arranged in a matrix. Data of an input image is displayed on the pixel array 10. The display panel 100 further comprises a REF line 16 commonly connected to neighboring pixels 10 and a VDD line supplying a high-potential driving voltage VDD to the pixels 10. A predetermined reset voltage Vini may be supplied to the pixels 10 via the REF line 16.

The gate lines 12a, 12b, and 12c comprise a plurality of first scan lines 12a to which a first scan pulse is supplied, a plurality of second scan lines 12b to which a second scan pulse is supplied, and a plurality of EM signal lines 12c to which an EM signal is supplied. In FIGS. 3 and 4, SCAN1 denotes the first scan pulse, SCAN2 denotes the second scan pulse, and EM denotes the EM signal.

To display colors, each of the pixels 10 may be divided into a red subpixel, a green subpixel, and a blue subpixel. Each pixel 10 may further comprise a white subpixel. Wires such as a data line 11, gate lines 12a, 12b, and 12c, the REF line 16, and the VDD line, are connected to each pixel 10.

A touchscreen using in-cell touch sensors may be implemented on the display panel 100. Also, on-cell touch sensors or add-on touch sensor may be disposed on the display panel 100. A touch sensor driver may be integrated in the drive IC DIC. The touch sensor driver outputs the coordinates of a touch input position by using touch sensors.

1 frame period of the display device is divided into a scanning period in which data is addressed to pixels and data of an input image is written to each of the pixels and a duty driving period, subsequent to the scanning period, in which the pixels repeatedly turn on and off in response to an alternating current EM signal EM. The scanning period is only approximately 1 horizontal period, so most of the 1 frame period corresponds to the duty driving period. The pixels 10 store a data voltage in the scanning period. In the duty driving period subsequent to the scanning period, the pixels 10 display data with the same brightness during 1 frame period by the data voltage stored in the scanning period without requiring more data voltage, while turning on and off repeatedly in response to the alternating EM signal EM.

The display panel drive circuit comprises a data driver driving the data lines, a gate driver driving the gate lines 12a, 12b, and 12c, and a timing controller controlling the data driver and gate driver. The data driver and the timing controller may be integrated in the drive IC DIC. The gate driver may be placed directly on the substrate of the display panel 100, along with the pixel array.

The display panel drive circuit displays an event view on the entire screen of the display panel 100 in a first screen mode, and displays preset AOD information on a part of the screen of the display panel 100 in a second screen mode. The display position of the AOD information is changed when the second screen mode is resumed after the first screen mode is finished. The display panel drive circuit switches between the first screen mode and the second screen mode in response to a command code generated by a controller incorporated in the mainboard 104 or driver IC DIC.

The data driver converts data of an input image to a gamma compensation voltage under control of the timing controller to generate a data voltage, and outputs the data voltage to the data lines 11. The data driver may output a predetermined reference voltage Vref to the data lines 11 during the reset period ti, in order to reset the driving elements of the pixels 10.

The gate driver supplies scan pulses SCAN1 and SCAN2 to the scan lines 12a and 12b under control of the timing controller. The first and second scan pulses SCAN1 and SCAN2 are synchronized with the data voltage. The first scan pulse SCAN1 is at ON level when the data voltage is supplied to the pixels, thereby turning on the switching element T3 of FIG. 4 to select the pixels 10 to charge with the data voltage. The second scan pulse SCAN2 rises simultaneously with the first scan pulse SCAN1 and falls before the first scan pulse SCAN1 to reset the pixels 10 during the reset period ti of FIG. 5. The gate driver outputs an EM signal EM and supplies it to the EM signal lines 12c under control of the timing controller. The gate driver 104 shifts signals applied to the scan lines 12a and 12b and EM signal lines 12c by shifting the scan pulses SCAN1 and SCAN2 and the EM signal EM.

The timing controller receives data of an input image from the mainboard 104, and receives timing signals synchronized with the data. The timing signals comprise a vertical synchronization signal Vsync, a horizontal synchronization signal Hsync, a clock signal CLK, and a data enable signal DE. The timing controller generates a data timing control signal for controlling the operation timing of the data driver, a gate timing control signal for controlling the operation timing of the gate driver, and a signal for controlling the operation timing of the touch sensor driver, based on a timing control signal received from a host system.

Each subpixel of the pixels 10 comprises an OLED, a plurality of thin-film transistors (TFTs) T1 to T4, and a storage capacitor Cst, as shown in FIG. 4. A capacitor C may be connected between a drain of the second TFT T2 and a second node B. In FIG. 4, "Coled" denotes the parasitic capacitance of the OLED.

The OLED is driven by an amount of current regulated by the first TFT T1 according to a data voltage Vdata. A current path of the OLED is switched by the second TFT T2. The OLED comprises an organic compound layer formed between an anode and cathode of the OLED. The organic compound layer may comprise, but not limited to, a hole injection layer HIL, a hole transport layer HTL, an emission layer EML, an electron transport layer ETL, and an electron injection layer EIL. The anode of the OLED is connected to the second node B, and the cathode of the OLED is connected to a VSS line to which a base voltage VSS is applied.

The TFTs T1 to T4 are illustrated as, but not limited to, n-type MOSFETs. For example, the TFTs T1 to T4 may be implemented as p-type MOSFETs. In this case, the scan signals SCAN1 and SCAN2 and the EM signal EM are reversed in phase. The TFTs may be implemented as one among an amorphous silicon (a-Si) TFT, a polysilicon TFT, an oxide semiconductor TFT, and a combination thereof.

The anode of the OLED is connected to the first TFT T1 via the second node B. The cathode of the OLED is connected to a base voltage source to be supplied with the base voltage VSS. The base voltage VSS may be a negative low-potential direct current voltage.

The first TFT T1 is a driving element that regulates a current Ioled flowing through the OLED according to a gate-source voltage Vgs. The first TFT T1 comprises a gate connected to a first node A, a drain connected to a source of the second TFT T2, and a source connected to the second node B. The storage capacitor Cst is connected between the first node A and the second node B to maintain the gate-source voltage Vgs of the first TFT T1.

The second TFT T2 is a switching element that switches the current flowing through the OLED in response to an EM signal EM. A duty driving method is implemented by regulating the turn-on time and turn-off time of the OLED according to a duty ratio of the EM signal EM. A drain of the second TFT T2 is connected to a VDD line to which a high-potential driving voltage VDD is supplied. The source of the second TFT T2 is connected to the drain of the first TFT T1. A gate of the second TFT T2 is connected to an EM signal line 12c to be supplied with an EM signal EM. The EM signal EM is at ON level during a sampling period is to turn on the second TFT T2, and is reversed to OFF level in a reset period ti and a programming period tw to turn off the second TFT T2. Then, the EM signal EM is applied as an alternating current signal that swings between ON level and OFF level according to a PWM duty ratio during a light emission period tem, in order to switch the current path of the OLED.

The third TFT T3 is a switching element that supplies a data voltage Vdata to the first node A in response to a first scan pulse SCAN1. The third TFT T3 comprises a gate connected to a first scan line 12a, a drain connected to the data line 11, and a source connected to the first node A. The first scan pulse SCAN1 is supplied to the pixels 10 via the first scan line 12a. The first scan pulse SCAN1 is at ON level for approximately 1 horizontal period 1H to turn on the third TFT T3, and is reversed to OFF level during the light emission period tem to turn off the third TFT T3.

The fourth TFT T4 is a switching element that supplies a reference voltage Vref to the second node B in response to a second scan pulse SCAN2. The fourth TFT T4 comprises a gate connected to a second scan line 12b, a drain connected to a REF line 16, and a source connected to the second node B. The second scan pulse SCAN2 is supplied to the pixels 10 via the second scan line 12b. The second scan pulse SCAN2 is at ON level during the reset period ti to turn on the fourth TFT T4, and remains at OFF level during the remaining periods to keep the fourth TFT T4 OFF.

The storage capacitor Cst is connected between the first node A and the second node B to store a voltage difference between the two nodes. The storage capacitor Cst samples a threshold voltage Vth of the first TFT T1, which is a driving element, based on a source-follower method. The capacitor C is connected between the VDD line and the second node B. When there is a change in the electric potential of the first node A according to the data voltage Vdata during the programming period tw, the change is distributed between the capacitors Cst and C so that the voltage resulting from the distribution is reflected to the second node B.

A scanning period for a pixel 10 may be divided into a reset period ti, a sampling period ts, a programming period tw, and a light emission period tem. The scanning period is set to approximately 1 horizontal period 1H, in which data is written to pixels arranged on one horizontal line in the pixel array. In the scanning period, a threshold voltage of the first TFT T1, which is a driving element of the pixel 10, is sampled, and the threshold voltage is added to a data voltage. Therefore, in the 1 horizontal period 1H, data DATA of an input image is compensated by an amount corresponding to the threshold voltage of the driving element and then written to the pixel 10.

When the reset period ti begins, the first and second scan pulses SCAN1 and SCAN2 rise to ON level. At the same time, the EM signal EM falls to OFF level. In the reset period ti, the second TFT T2 is turned off to block the current path of the OLED. The third and fourth TFTs T3 and T4 are turned on in the reset period ti. In the reset period ti, a predetermined reference voltage Vref is supplied to the data line 11. In the reset period ti, the voltage of the first node A is reset to the reference voltage Vref, while the voltage of the second node B is reset to the predetermined reset voltage Vini. After the reset period ti, the second scan pulse SCAN2 is switched to OFF level, thereby turning off the fourth TFT T4. Here, the ON level indicates a gate voltage level for the TFTs that turns on the switching elements T2 to T4 of the pixels, and the OFF level indicates a gate voltage level that turns off the switching elements T2 to T4 of the pixels.

In the sampling period ts, the first scan pulse SCAN1 remains at ON level, while the second scan pulse SCAN2 remains at OFF level. The EM signal EM rises to ON level when the sampling period ts begins. In the sampling period ts, the second and third TFTs T2 and T3 are turned on. In the sampling period ts, the second TFT T2 is turned on in response to the EM signal EM of ON level. In the sampling period ts, the third TFT T3 remains ON by the first scan pulse SCAN1 of ON level. In the sampling period ts, the reference voltage Vref is supplied to the data line 11. In the sampling period ts, the potential at the first node A is maintained at the reference voltage Vref, while the potential at the second node B rises by a drain-source current Ids. Based on this source-follower method, the gate-source voltage Vgs of the first TFT T1 is sampled as a threshold voltage Vth of the first TFT T1, and the sampled threshold voltage Vth is stored in the storage capacitor Cst. In the sampling period ts, the voltage of the first node A is the reference voltage Vref, and the voltage of the second node B is Vref-Vth.

In the programming period tw, the third TFT T3 remains ON by the first scan pulse SCAN 1 of ON level. The other TFTs T1, T2, and T4 are turned off. In the programming period tw, a data voltage Vdata of an input image is supplied to the data line 11. The data voltage Vdata is applied to the first node A. The voltage difference Vdata-Vref at the first node A is distributed between the capacitors Cst and C and the voltage resulting from the distribution is reflected to the second node B, thereby programming the gate-source voltage Vgs of the first TFT T1. In the programming period tw, the voltage at the first node A is the data voltage Vdata, and the voltage at the second node B becomes (Vref−Vth)+C'*(Vdata−Vref), which is obtained by summing Vref−Vth, which is set in the sampling period ts, and the voltage C'*(Vdata−Vref) resulting from the voltage distribution between the capacitors Cst and C. As a result, in the programming period tw, the gate-source voltage Vgs of the first TFT T1 is programmed to Vdata−(Vref+Vth)−C'*(Vdata−Vref). In this case, C' denotes Cst/(Cst+C).

When the light emission period tem begins, the EM signal EM rises to ON level again, while the first scan pulse SCAN1 falls to OFF level. In the light emission period tem, the second TFT T2 remains turned on to form a current path through the OLED. In the light emission period tem, the first TFT T1 regulates the amount of current flowing through the OLED according to a data voltage.

The light emission period tem continues from the end of the programming period tw until the start of the reset period ti of the next frame. In the present invention, in the light emission period tem, the ratio of on time compared off time of the pixels is adjusted by switching the EM signal EM with a PWM duty ratio which is modulated according to data of an input image, rather than allowing the pixels to emit light continuously. When the EM signal EM is at ON level, the second TFT T2 is turned on to form a current path through the OLED. In the light emission period tem, the OLED emits light as the current Ioled regulated according to the gate-source voltage Vgs of the first TFT T1 flows through the OLED. In the light emission period tem, the first and second scan pulses SCAN1 and SCAN2 are at OFF level, so that the third and fourth TFTs T3 and T4 are turned off.

The current Ioled flowing through the OLED in the light emission period tem is represented by Equation 1. The OLED emits light by the current Ioled to exhibit the brightness of the input image.

$$Ioled = \frac{k}{2}[(1-C')(Vdata - Vref)]^2 \quad \text{[Equation 1]}$$

where k is a proportional constant that is determined by the mobility, parasitic capacitance, and channel capacity of the first TFT T1.

Since Vth is included in Vgs, which is programmed in the programming period tw, Vth is canceled out from the Ioled in Equation 1. Accordingly, the effect of the threshold voltage Vth of a driving element, i.e., the first TFT T1, on the current Ioled in the OLED is eliminated.

Figure 6:
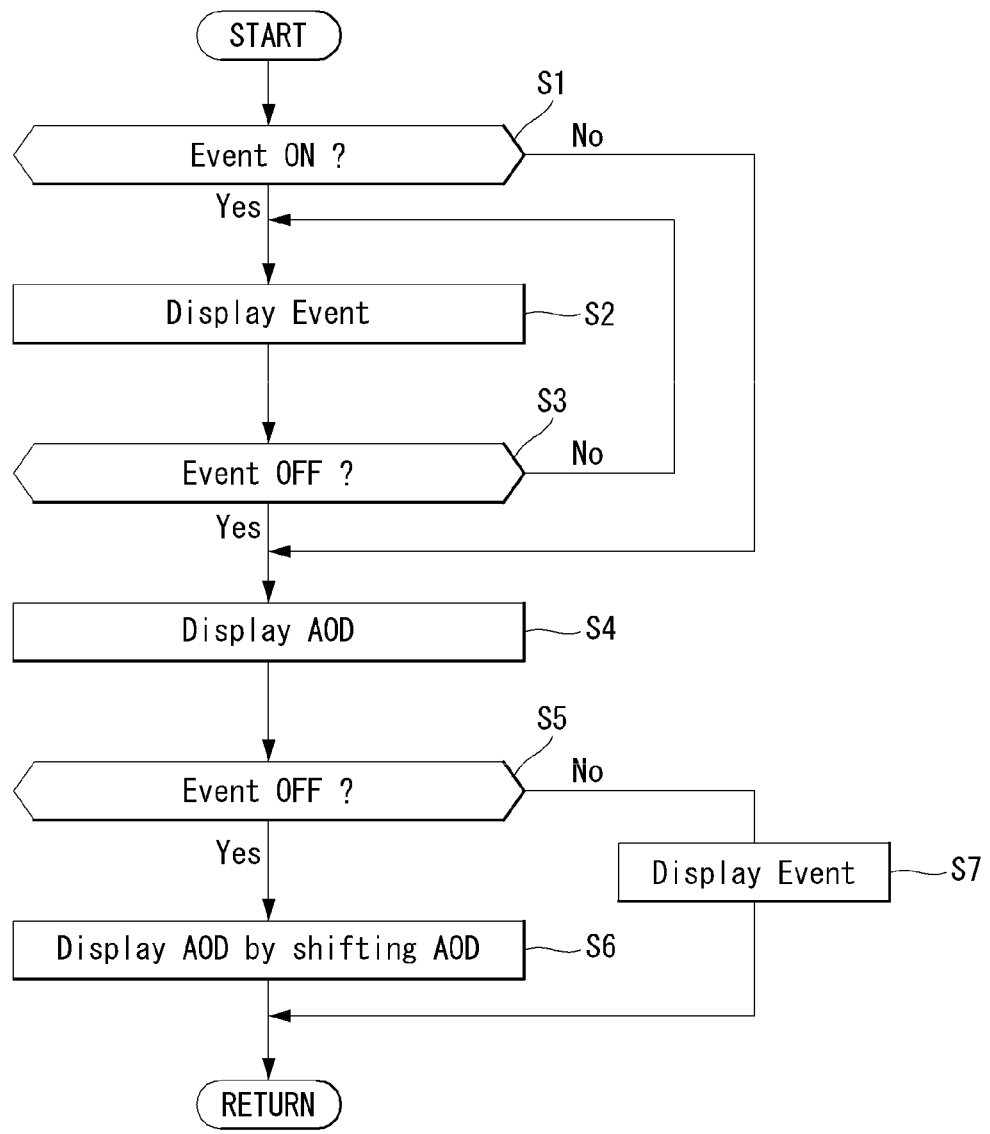
FIG. 6 is a view showing an AOD control method for a display device according to an exemplary embodiment of the present invention.
Figure 7:
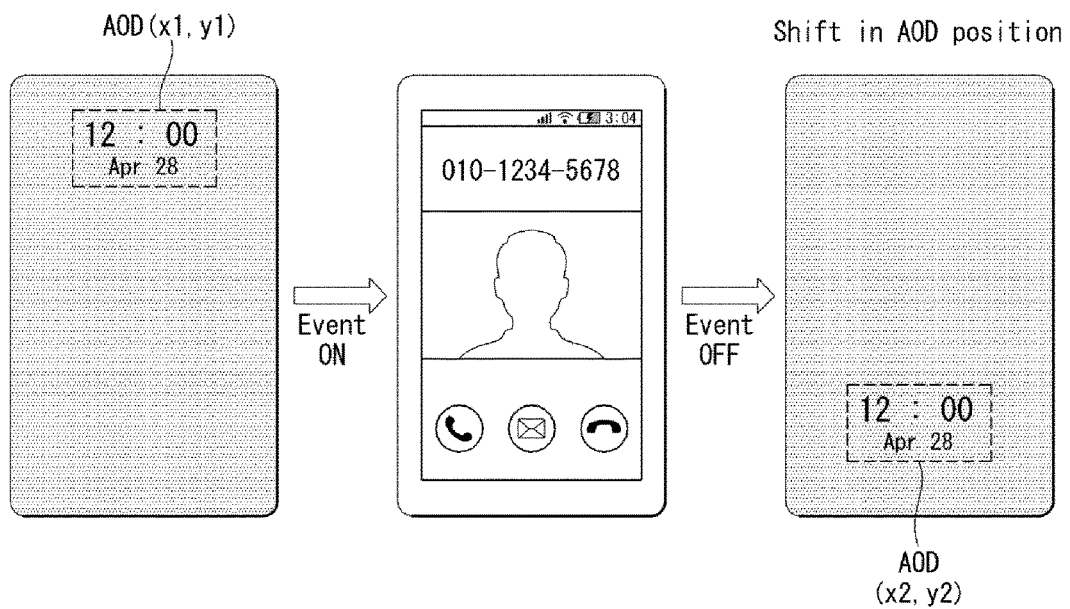
FIG. 7 is a view showing an example in which the position of AOD information is shifted after an event is displayed.

FIG. 6 is a view showing an AOD control method for a display device according to an exemplary embodiment of the present invention. FIG. 7 is a view showing an example in which the positon of AOD information is shifted after an event is displayed.

Referring to FIGS. 6 and 7, when an event occurs, a controller—for example, an application processor (AP)—transmits an event image signal associated with the running of the event, along with an event run command, to the display device. An event running processor (not shown) runs the event in response to the event run command. The drive IC DIC of the display device displays the event image signal on the display panel 100 in response to the event run command. When the event is run, the event image is displayed on the entire screen of the display device (S1 and S2).

The controller generates an AOD command in a usage environment S3 in which no event occurs. When the AOD command is generated, AOD information pre-stored in a memory or register on the mainboard 104 or display device's drive IC DIC is displayed on some pixels of the display panel 100 (S4). The AOD information is information that is specified by the user regardless of an input image. As described previously, the AOD information may be, but not limited to, a clock, text, image, or icon image associated with an application.

When the event is run again, the controller executes the steps S1 and S2. When the AOD display screen begins to reappear after the event is run (S5), the controller generates an AOD command. The drive IC DIC displays the AOD information on a part of the screen by shifting the display position of the AOD information. Accordingly, as shown in FIG. 7, the display position of the AOD information is shifted from (x1, y1) to (x2, y2) after the event is run. The user does not notice the AOD information shifting continuously but instead sees the AOD information being displayed on the new position (x2, y2) after the event screen disappears.

As described above, the present invention can prevent an afterimage leftover from displaying AOD information and save the user from inconvenience caused by a shift in AOD display position by shifting the display position of the AOD information when an AOD usage environment (second screen mode) is resumed after an event is run (first screen mode), so as to prevent the user from noticing the display position of the AOD information shifting.

Although will be apparent to those skilled in the art that various modifications and variations can be made in the display device, always-on-display control method, and mobile terminal using the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel comprising a pixel array of pixels arranged in a matrix by the intersections of data lines and gate lines; and
   a drive circuit configured to:
     write data to the pixels of the display panel;
     display a first event view on the display panel in a first screen mode; and
     display preset information on the display panel in a first display of a second screen mode, the preset information having a first position on the screen that does not move during the first display of the second screen mode;
     display a second event view on the display panel in a second display of the first screen mode; and
     change a display position of the preset information in the second screen mode when the second screen mode is resumed after the second event view in the first screen mode is finished, such that the preset information has a second position on the screen that does not move during the second display of the second screen mode, the second position being different from the first position.

2. The display device of claim 1, wherein:
   the information in the second screen mode is one or more of the following: a clock, text, an image, and an icon image associated with an application; and
   the information in the second screen mode comprises always-on-display (AOD) information that is specified as selected by the user.

3. An always-on-display (AOD) control method for a display device, the method comprising:
   displaying a first event view on the display panel in a first screen mode;
   displaying preset information on the display panel in a first display of a second screen mode, the preset information having a first position on the screen that does not move during the first display of the second screen mode;
   displaying a second event view on the display panel in a second display of the first screen mode; and
   changing a display position of the preset information in the second screen mode when the second screen mode is resumed after the second event view in the first screen mode is finished, such that the preset information has a second position on the screen that does not move during the second display of the second screen mode, the second position being different from the first position.

4. A mobile terminal, comprising:
a display panel comprising a pixel array of pixels arranged in a matrix by the intersections of data lines and gate lines;
a controller configured to control the first screen mode and the second screen mode; and
a drive circuit configured to:
  write data to the pixels of the display panel;
  display a first event view on the display panel in a first screen mode; and
  display preset information on the display panel in a first display of a second screen mode, the preset information having a first position on the screen that does not move during the first display of the second screen mode;
  display a second event view on the display panel in a second display of the first screen mode; and
  change a display position of the preset information in the second screen mode when the second screen mode is resumed after the second event view in the first screen mode is finished, such that the preset information has a second position on the screen that does not move during the second display of the second screen mode, the second position being different from the first position.

5. The mobile terminal of claim 4, wherein:
the information in the second screen mode is one or more of the following: a clock, text, an image, and an icon image associated with an application; and
the information in the second screen mode comprises always-on-display (AOD) information that is specified as selected by the user.

6. The mobile terminal of claim 4, wherein the controller comprises an application processor (AP).

7. An always-on-display (AOD) control method for a display device, the method comprising:
  driving an entire screen to display an event view in a display mode;
  driving only a portion of the entire screen to display a predetermined information in a standby mode; and
  moving the portion from a first position of the entire screen to a second position of the entire screen whenever the display mode is changed to the standby mode,
  wherein a remainder of the screen, other than at a location of the portion at which the predetermined information is driven, is not driven in the standby mode, and
  wherein a size of the portion is less than a size of the entire screen.

8. The AOD control method of claim 7, wherein the position of the portion of the entire screen is fixed until the standby mode is changed to the display mode.

9. The AOD control method of claim 7, wherein the predetermined information includes at least one of clock, text, image, and icon image associated with an application.

* * * * *